United States Patent
Liu

(10) Patent No.: US 11,001,739 B2
(45) Date of Patent: May 11, 2021

(54) CARBONIZED COMPOSITE THERMOPLASTIC POLYIMIDE FILM AND PREPARATION METHOD THEREOF

(71) Applicant: SHENZHEN DANBOND TECHNOLOGY CO., LTD, Guangdong (CN)

(72) Inventor: Ping Liu, Guangdong (CN)

(73) Assignee: SHENZHEN DANBOND TECHNOLOGY CO., LTD, Shenzhen (CN)

(*) Notice: Subject to any disclaimer, the term of this patent is extended or adjusted under 35 U.S.C. 154(b) by 360 days.

(21) Appl. No.: 16/121,254

(22) Filed: Sep. 4, 2018

(65) Prior Publication Data

US 2018/0362823 A1    Dec. 20, 2018

Related U.S. Application Data

(63) Continuation of application No. PCT/CN2016/095537, filed on Aug. 16, 2016.

(30) Foreign Application Priority Data

Mar. 4, 2016   (CN) .......................... 201610125484.1

(51) Int. Cl.
| | |
|---|---|
| *C09K 5/14* | (2006.01) |
| *C08J 5/18* | (2006.01) |
| *C01B 32/205* | (2017.01) |
| *B32B 38/00* | (2006.01) |
| *B32B 27/28* | (2006.01) |
| *B32B 27/08* | (2006.01) |
| *B32B 9/04* | (2006.01) |
| *C01B 32/05* | (2017.01) |
| *B32B 15/08* | (2006.01) |
| *B32B 37/10* | (2006.01) |
| *B32B 37/02* | (2006.01) |

(52) U.S. Cl.
CPC ............... *C09K 5/14* (2013.01); *B32B 9/04* (2013.01); *B32B 15/08* (2013.01); *B32B 27/08* (2013.01); *B32B 27/281* (2013.01); *B32B 38/0036* (2013.01); *C01B 32/05* (2017.08); *C01B 32/205* (2017.08); *C08J 5/18* (2013.01); *B32B 37/02* (2013.01); *B32B 37/10* (2013.01); *B32B 2307/302* (2013.01); *B32B 2313/04* (2013.01); *B32B 2457/00* (2013.01); *C08J 2379/08* (2013.01)

(58) Field of Classification Search
CPC .......... C09K 5/14; C01B 32/05; B32B 15/08; B32B 38/0036; B32B 27/281; B32B 27/08; B32B 9/04; B32B 2307/302; B32B 2457/00; B32B 37/02; B32B 2313/04; B32B 37/10; C08J 5/18; C08J 2379/08
See application file for complete search history.

(56) References Cited

U.S. PATENT DOCUMENTS

2016/0279902 A1* 9/2016 Yasuda .................. B32B 27/06

FOREIGN PATENT DOCUMENTS

| CN | 103232818 A | 8/2013 |
|---|---|---|
| CN | 103568418 A | 2/2014 |
| CN | 103922324 A | 7/2014 |
| CN | 104495795 A * | 4/2015 |
| CN | 104495795 A | 4/2015 |
| CN | 104909357 A | 9/2015 |
| CN | 104909358 A | 9/2015 |
| CN | 105752959 A | 7/2016 |
| JP | H10517117 A | 1/1993 |

OTHER PUBLICATIONS

Hishiyama et al, Graphite Films Prepared From Carbonized Polyimide Films, 1991, Carbon, vol. 30, No. 3, pp. 333-337 (Year: 1991).*
Takeichi et al, Carbonization and graphitization of BPDA/PDA polyimide films: effects of structure of polyimide precursor, 1998, Carbon, vol. 37, pp. 569-575 (Year: 1998).*
Hiroyoshi et al, Synthesis and physical properties of pyroltic graphite, 2003, IEEJ Transactions on Fundamentals and Materials, vol. 123, Issue 11, pp. 1115-1123 (Year: 2003).*
Takeichi et al, Carbonization and Graphitization of Kapton-Type Polyimide Films Prepared From Polyamide Alkyl Ester, 1997, Carbon, vol. 36, pp. 117-122 (Year: 1997).*
Kapton Polyimide Characteristics (Year: 2019).*
International Search Report (English and Chinese) and Written Opinion issued in PCT/CN2016/095537, dated Dec. 12, 2016, 13 pages.
Uwai, et al., "Preparation of High-density Glassy Carbon from Poylimide", Carbon Techniques, No. 2, 31 Dec. 31, 1991, 2 pages (Cited in PCT International Search Report).

* cited by examiner

Primary Examiner — Francisco W Tschen
Assistant Examiner — Abhishek A Patwardhan
(74) Attorney, Agent, or Firm — Hamre, Schumann, Mueller & Larson, P.C.

(57) ABSTRACT

A preparation method comprises the following steps: S1, laminating a plurality of thermoplastic polyimide films; S2, performing heat treatment while pressing the laminated thermoplastic polyimide films for bonding, wherein the temperature of heat treatment is lower than the temperature at which the thermoplastic polyimide films begin thermal decomposition, so that bonding occurs between the thermoplastic polyimide films to form a composite film; S3, heating the obtained composite film to a temperature above the temperature at which thermal decomposition begins, and then performing heat treatment, thereby obtaining the carbonized composite thermoplastic polyimide film. By the adoption of the preparation method, the TPI films can be conveniently and effectively formed into a high-quality multi-layer carbonized composite film and a multi-layer graphite composite film, and the composite films have excellent thermal diffusivity and bending resistance, so that heat dissipation of electronic equipment, precision instruments and the like can be easily realized.

9 Claims, No Drawings

CARBONIZED COMPOSITE THERMOPLASTIC POLYIMIDE FILM AND PREPARATION METHOD THEREOF

CROSS REFERENCE TO RELATED APPLICATIONS

This application is a continuation application of PCT/CN2016/095537 filed on Aug. 16, 2016. The contents of the above-mentioned applications are all hereby incorporated by reference.

TECHNICAL FIELD

The invention relates to a carbonized composite thermoplastic polyimide (TPI) film and a preparation method thereof.

BACKGROUND

With the rapid development of smartphones and wearable electronic products, the demand for heat dissipation components mounted on CPU chips of computers and various electronic and electrical devices is increasingly higher, and it is expected that heat dissipation components should be light, thin, short, small, flexible and made of a heat dissipation and cooling material. Problems like how to protect CPU from damage attract more attention. Parts needing to be cooled, like chips, are usually cooled by installing heat conduction pipes, heat dissipators, cooling fins and other heat conductors on the back of the part and on an equipment frame where the part is mounted, in this way, the part is cooled by transferring the heat generated by the part to the outside.

Generally, heat conducting materials for cooling the installation parts mainly include copper foil and aluminum foil, but copper foil or aluminum foil cannot be installed on heat conduction pipe type heating parts, so fans or other devices are adopted to dissipate heat to the outside. As electronic products become more miniaturized, intelligent and multifunctional, there is a tendency to increase the calorific value to mount semiconductor components. In order to make a frame more compact, the space of a frame part for inserting cooling fins and fans is restricted. In order to solve the problem of heat dissipation, people pay close attention to the selection and development of excellent heat dissipation materials. As a thermal conductor, a graphite composite film (multi-layer) with excellent thermal diffusivity is of a layered structure formed by carbon. The graphite composite film has very high thermal conductivity and low density, and is one tenth of the weight of copper. The graphite composite film has high conductivity, light weight and is flexible. The graphite composite film needs to pass through gaps and has new expectations for places.

There are two methods for preparing the multi-layer graphite composite film at present. One method is to use natural graphite as the raw material, immerse the raw material in acid, and then conduct heating to achieve inter-layer expansion, and the method is called graphite expansion method. Then, expanded graphite and a bonding material are subjected to high-pressure processing for bonding to obtain the multi-layer graphite composite film. The smallest thickness of the film produced in this way can only be about 300 μm. The film has a one-axis bending property, small sharp parts and large deviation in in-plane dispersity, begins to crystallize during carbonization, and is not flexible. The other is to combine and heat multiple polyimide films by a high-molecular sintering method, remove hydrogen, oxygen and nitrogen in sequence, leave only carbon atoms to form a mesh structure, begin crystal alignment at 3000° C., and form a shape under pressure. The prepared film has a large tortuosity ratio, can realize two-axis bending, and has a small in-plane dispersion degree. The composite film can be 6 μm thick, inter-layer bonding in the thickness direction and a part of the hexagonal mesh structure can be cut off, so as to provide crystallization freedom, thus having flexibility.

SUMMARY OF THE INVENTION

The main objective of the invention is to provide a carbonized composite thermoplastic polyimide film and a preparation method thereof aiming at the defects of the prior art.

In order to achieve the above objective, the invention adopts the following technical scheme:

the preparation method of the carbonized composite thermoplastic polyimide film comprises the following steps:

S1, laminating a plurality of thermoplastic polyimide films;

S2, performing heat treatment while pressing the laminated thermoplastic polyimide films for bonding, wherein the temperature of heat treatment is lower than the temperature at which the thermoplastic polyimide films begin thermal decomposition, so that bonding occurs between the thermoplastic polyimide films to form a composite film; and S3, heating the obtained composite film to a temperature above the temperature at which thermal decomposition begins, and then performing heat treatment, thereby obtaining the carbonized composite thermoplastic polyimide film.

Further, in S3, the composite film is subjected to heat treatment in a non-oxidizing environment.

Further, in S2, a continuous roller hot press is used for continuous hot pressing of the laminated thermoplastic polyimide films.

Further, in S1, the thermoplastic polyimide films are laminated by unit, each unit comprises a plurality of thermoplastic polyimide films, and an indium alloy foil layer is sandwiched between every two units; and in S2, the plurality of laminated units are calendered to form the multi-layer composite film, each indium alloy foil layer fills fine pits in the surfaces of the composite films on both sides thereof, and the carbonized composite thermoplastic polyimide film is prepared through graphitization pressing of the multi-layer composite film.

Further, in S1, the thermoplastic polyimide films are laminated by unit, each unit comprises a plurality of thermoplastic polyimide films, and an indium alloy foil layer is sandwiched between every two units;

in S2, pressing is performed with a roller hot press, temperature is increased from normal temperature to 300-400° C. at a speed of 30° C./min under a pressure of 40 kg/cm², the temperature is maintained for 30 minutes, and then circulating cooling is conducted by means of heat transfer oil, so as to obtain the composite film; and in S3, temperature is increased to 1000° C. while the composite film is pressed, the temperature is maintained for 30 minutes, and the carbonized composite thermoplastic polyimide film is obtained after cooling.

Further, each thermoplastic polyimide film is 12.5 μm thick. In S1, each unit comprises 30 thermoplastic polyimide films for lamination.

Further, the temperature at which the thermoplastic polyimide films begin thermal decomposition is 460° C.

The method further comprises the following step:

S4, further heating the carbonized composite thermoplastic polyimide film obtained in S3 to 2000° C. in the same way, so as to obtain amorphous vitric carbon.

The method further comprises the following step:

S4', further heating the carbonized composite film obtained in S3 to 3000° C. in the same way by using a graphitization furnace, so as to obtain a carbonized composite film.

The invention also discloses a carbonized composite thermoplastic polyimide film. The carbonized composite thermoplastic polyimide film is prepared by any one of the above-mentioned preparation methods for the carbonized composite thermoplastic polyimide film.

Beneficial Effects:

by the adoption of the preparation method of the carbonized composite thermoplastic polyimide film, the TPI films can be conveniently and effectively formed into a high-quality multi-layer carbonized composite film and a multi-layer graphite composite film through carbonization and graphitization, and the composite films have excellent thermal diffusivity and bending resistance, so that heat dissipation of electronic equipment, precision instruments and the like can be easily realized.

In particular, the carbonized composite thermoplastic polyimide film obtained by the preparation method of the invention can be used as a heat dissipation film and a cooling fin of electronic equipment, precise instruments, mobile phones, computers, LED lighting equipment and the like. Due to the bending resistance, thermal diffusivity, thermal conductivity, excellent exothermic property and other significant advantages, the carbonized composite thermoplastic polyimide film is very suitable for heat dissipation of high output electronic components which emit a lot of heat.

The preparation method of the invention can carry out carbonization treatment and graphitization heat treatment conveniently, and is very favorable in the aspects of equipment, energy consumption, time consumption, production process management and the like, thereby being beneficial to industrial production.

DETAILED DESCRIPTION

Hereinafter, the embodiments of the invention will be described in detail. It should be emphasized that the following description is merely exemplary and is not intended to limit the scope and application of the invention.

In one embodiment, a preparation method of a carbonized composite thermoplastic polyimide film comprises the following steps:

S1, laminating a plurality of thermoplastic polyimide films;

S2, performing heat treatment while pressing the laminated thermoplastic polyimide films for bonding, wherein the temperature of heat treatment is lower than the temperature at which the thermoplastic polyimide films begin thermal decomposition, so that bonding occurs between the thermoplastic polyimide films to form a composite film; and S3, heating the obtained composite film to a temperature above the temperature at which thermal decomposition begins, and then performing heat treatment, thereby obtaining the carbonized composite thermoplastic polyimide film.

In a preferred embodiment, in S3, the composite film is subjected to heat treatment in a non-oxidizing environment.

In a preferred embodiment, in S2, a continuous roller hot press is used for continuous hot pressing of the laminated thermoplastic polyimide films.

In a preferred embodiment, in S1, the thermoplastic polyimide films are laminated by unit, each unit comprises a plurality of thermoplastic polyimide films, and an indium alloy foil layer is sandwiched between every two units; in S2, the plurality of laminated units are calendered to form the multi-layer composite film, each indium alloy foil layer fills fine pits in the surfaces of the composite films on both sides thereof, and the carbonized composite thermoplastic polyimide film is prepared through graphitization pressing of the multi-layer composite film.

In a more preferred embodiment, in S1, the thermoplastic polyimide films are laminated by unit, each unit comprises a plurality of thermoplastic polyimide films, and an indium alloy foil layer is sandwiched between every two units; in S2, pressing is performed with a roller hot press, temperature is increased from normal temperature to 300-400° C. at a speed of 30° C./min under a pressure of 40 kg/cm$^2$, the temperature is maintained for 30 minutes, and then circulating cooling is conducted by means of heat transfer oil, so as to obtain the composite film; in S3, temperature is increased to 1000° C. while the composite film is pressed, the temperature is maintained for 30 minutes, and the carbonized composite thermoplastic polyimide film is obtained after cooling.

In a further preferred embodiment, each thermoplastic polyimide film is 12.5 μm thick. In S1, each unit comprises 30 thermoplastic polyimide films for lamination.

In a further preferred embodiment, the temperature at which the thermoplastic polyimide films begin thermal decomposition is 460° C.

In another preferred embodiment, the preparation method of the carbonized composite thermoplastic polyimide film further comprises the following steps:

S4, further heating the carbonized composite thermoplastic polyimide film obtained in S3 to 2000° C. in the same way, so as to obtain amorphous vitric carbon.

In yet another preferred embodiment, the preparation method of the carbonized composite thermoplastic polyimide film further comprises the following steps:

S4', further heating the carbonized composite film obtained in S3 to 3000° C. in the same way by using a graphitization furnace, so as to obtain a carbonized composite film.

In one embodiment, a carbonized composite thermoplastic polyimide film is provided, and the carbonized composite thermoplastic polyimide film is prepared by the preparation method of the carbonized composite thermoplastic polyimide film according to any one of the above embodiments.

According to the embodiments of the invention, the multiple thermoplastic polyimide films are laminated, the thermoplastic polyimide films are subjected to heat treatment while being pressed, and the temperature for heat treatment is lower than the temperature at which the thermoplastic polyimide films begin thermal decomposition, so that the thermoplastic polyimide films are bonded to form the composite film. The obtained composite film is heated in a non-oxidizing environment to a temperature above the temperature at which thermal decomposition begins, and then heat treatment is performed, so as to obtain the carbonized composite thermoplastic polyimide film. The essential part of the embodiments of the invention is to press the thermoplastic polyimide films for bonding in an environment with a temperature lower than the thermal decomposition temperature in advance. Due to certain micro-viscosity at normal temperature, the thermoplastic polyimide films can be made into a multi-layer composite film, carbonization treatment and graphitization heat treatment can be conducted conveniently, and it is very favorable in the aspects of equipment, energy consumption, time consumption, production process management and the like.

According to the embodiments of the invention, the multiple thermoplastic polyimide films are pressed for bonding in an environment with a temperature lower than the thermal decomposition temperature of the thermoplastic polyimide films, so that the decomposition temperature is selected from a heating process, and thus semi-conductor-like and carbonized vitric graphite crystals and graphitized carbon materials with foreign atom residues can be obtained according to requirements.

According to a preferred embodiment, a continuous roller hot press is used for continuous hot pressing of the multiple thermoplastic polyimide films, heating and pressurization are conducted at a temperature lower than the temperature at which the thermoplastic polyimide films begin thermal decomposition, continuous pressing is performed through the hot press, so that the surfaces of the films tend to be flat, uniform, free of scale and peeling, weak in bendability and lower in flexibility, electrostatic bonding caused by the polarization of an imide bonding portion of thermoplastic polyimide resin is made to begin from low-temperature pressing, and the glass transition temperature is converted to obtain the carbonized composite thermoplastic polyimide film.

According to a preferred embodiment, the thermoplastic polyimide films are laminated by unit, each unit comprises a plurality of thermoplastic polyimide films, and an indium alloy foil layer is sandwiched between every two units; the flexibility of indium alloy foil is excellent, the indium alloy foil layers are sandwiched between the units to conduct calendaring on the multiple laminated units to form the multi-layer composite film, the indium alloy foil fills fine pits in the surfaces of the composite films on both sides thereof, and then the carbonized composite film is prepared through graphitization pressing of the multi-layer composite film.

According to the above-mentioned preparation method of the embodiments of the present invention, sheet-like carbon materials and carbon materials in various shapes with a thickness ranging from several micrometers to a dozen micrometers, from several millimeters to a dozen millimeters, and from several centimeters to a dozen centimeters can be obtained, and the obtained products can be customized for production and can be used for various purposes.

Example 1

Thermoplastic polyimide films are prepared (for example, the product disclosed in Patent Publication No. CN103232818A, thickness being 12.5 μm, the temperature of thermal expansion coefficient being 360° C., the thermal decomposition begin temperature is 460° C.), one side is cut to be a square of 15 cm*15 cm, then the thermoplastic polyimide films are laminated by unit with 30 films in each unit, and an indium alloy foil layer is sandwiched between every two units; pressing is performed with a roller hot press, temperature is increased from normal temperature to 300-400° C. at a speed of 30° C./min under a pressure of 40 kg/cm$^2$, the temperature is maintained for 30 minutes, and then circulating cooling is conducted by means of heat transfer oil, so as to obtain a film which has no fracture, no peeling, high flexibility, no warping and no blistering; then temperature is increased to 1000° C., the temperature is maintained for 30 minutes, the carbonized composite film is obtained after cooling, and the carbonized composite film has no disorder of composite layers, no peeling between metal films, no pleats, complete carbonization, consistent color and uniform thickness.

Example 2

The carbonized composite film obtained from example 1 is further heated to 2000° C. in the same way to obtain vitric carbon which has no disorder of composite layers, no fracture, no peeling, high flexibility, no warpage, no blistering, and is amorphous on X-ray.

Example 3

The carbonized composite film obtained from example 1 is further heated to 3000° C. in the same way by using a graphitization furnace to obtain a carbonized composite film which has no disorder of composite layers, no fracture and no peeling. According to X-ray illumination, the light reflected by the carbonized composite film is 240 times as strong as a wavelength control.

Example 4

The temperature of the roller hot press in example 1 is changed to 400° C., and others are the same as those in examples 1-3. A good vitric carbonized and graphitized carbon material can also be obtained.

Comparative Example 1

When the temperature of the roller press in example 1 is changed to 500° C. and others are the same as those in example 1, during the experiment, composite layers can fracture, and thus a vitric carbon composite film cannot be formed. Furthermore, by repeating the same experiment at a temperature above the thermal decomposition begin temperature range of the thermoplastic polyimide films, results show that a vitric carbon composite film with better pre-bonding property and higher yield cannot be obtained compared with what is obtained below the thermal decomposition begin temperature.

The above is a further detailed description of the invention in connection with specific/preferred embodiments, and it cannot be considered that the specific implementation of the invention is limited to these descriptions. For those of ordinary skill in the art to which the invention belongs, they can make several substitutions or modifications to the described embodiments without departing from the inventive concept, and these substitutions or modifications should be considered as falling within the scope of the invention.

The invention claimed is:

1. A preparation method of a carbonized composite thermoplastic polyimide film, comprising the following steps:
   (S1) laminating a plurality of thermoplastic polyimide films, wherein the thermoplastic polyimide films are laminated by unit, each unit comprises a plurality of thermoplastic polyimide films, and an indium alloy foil layer is sandwiched between every two units;
   (S2) performing heat treatment while pressing the laminated thermoplastic polyimide films for bonding, wherein the temperature of heat treatment is lower than the temperature at which the thermoplastic polyimide films begin thermal decomposition, so that bonding occurs between the thermoplastic polyimide films to form a composite film, the plurality of laminated units are calendered to form the multi-layer composite film, and each indium alloy foil layer fills fine pits in surfaces of the composite films on both sides thereof; and (S3) heating the composite film to a temperature above the temperature at which thermal decomposition begins, and then performing heat treatment, thereby obtaining a carbonized composite thermoplastic polyimide film, wherein the carbonized composite thermoplastic polyimide film is prepared through graphitization pressing of the multi-layer composite film.

2. The preparation method of the carbonized composite thermoplastic polyimide film according to claim 1, wherein in S3, the composite film is subjected to heat treatment in a non-oxidizing environment.

3. The preparation method of the carbonized composite thermoplastic polyimide film according to claim 1, wherein in S2, a continuous roller hot press is used for continuous hot pressing of the laminated thermoplastic polyimide films.

4. The preparation method of the carbonized composite thermoplastic polyimide film according to claim 1, wherein
   in S2, the pressing is performed with a roller hot press, the temperature is increased from normal temperature to 300-400° C. at a speed of 30° C./min under a pressure of 40 kg/cm$^2$, the temperature is maintained for 30 minutes, and then circulating cooling is conducted by means of heat transfer oil, so as to obtain the composite film; and
   in S3, the temperature is increased to 1000° C. while the composite film is pressed, the temperature is maintained for 30 minutes, and the carbonized composite thermoplastic polyimide film is obtained after cooling.

5. The preparation method of the carbonized composite thermoplastic polyimide film according to claim 4, wherein each thermoplastic polyimide film is 12.5 μm thick, and in S1, each unit comprises 30 thermoplastic polyimide films for lamination.

6. The preparation method of the carbonized composite thermoplastic polyimide film according to claim 4, wherein the temperature at which the thermoplastic polyimide films begin thermal decomposition is 460° C.

7. The preparation method of the carbonized composite thermoplastic polyimide film according to claim 4, further comprising
   heating the carbonized composite thermoplastic polyimide film obtained in S3 to 2000° C. in the same way, so as to obtain amorphous vitric carbon.

8. The preparation method of the carbonized composite thermoplastic polyimide film according to claim 4, further comprising
   heating the carbonized composite film obtained in S3 to 3000° C. in the same way by using a graphitization furnace, so as to obtain the carbonized composite film.

9. A carbonized composite thermoplastic polyimide film, wherein the carbonized composite thermoplastic polyimide film is prepared by the preparation method of the carbonized composite thermoplastic polyimide film according to claim 1.

* * * * *